March 3, 1953  E. SCHLUETER  2,629,913
FASTENING DEVICE
Filed May 20, 1946
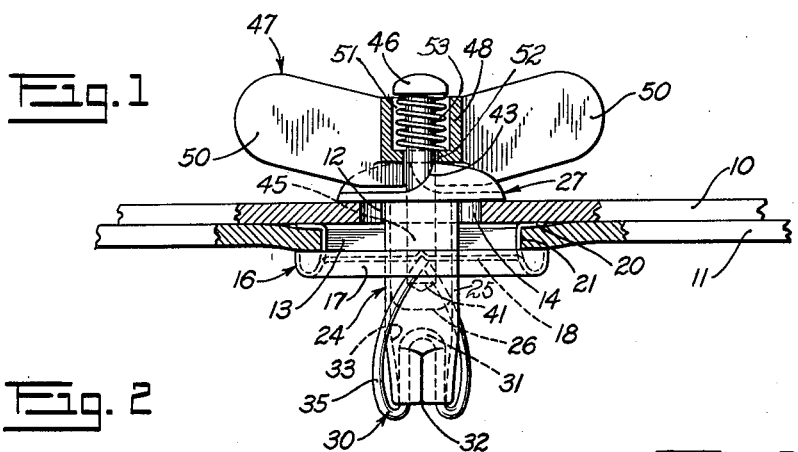
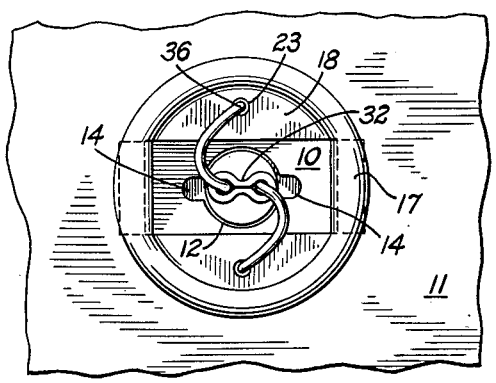
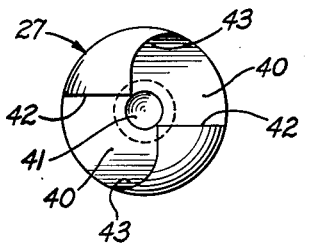
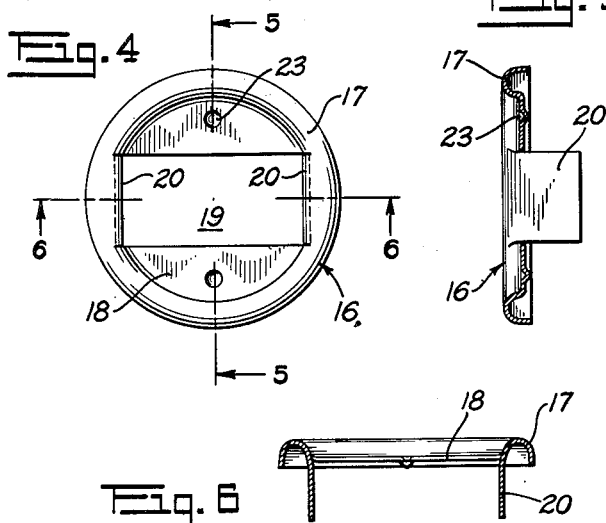
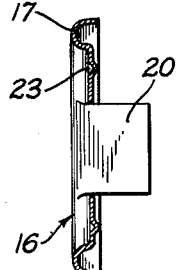
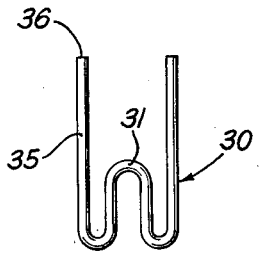
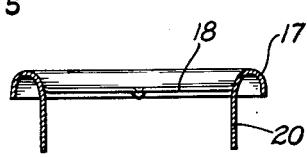
INVENTOR.
Ernest Schlueter
BY H. M. Kilpatrick
ATTORNEY Patented Mar. 3, 1953

2,629,913

UNITED STATES PATENT OFFICE 2,629,913

FASTENING DEVICE

Ernest Schlueter, Hollis, N. Y., assignor, by mesne assignments, to Simmons Fastener Corporation, Albany, N. Y., a corporation of New York Application May 20, 1946, Serial No. 671,092

16 Claims. (Cl. 24—221)

This invention relates to fastening devices and more particularly to devices for releasably fastening together two or more superposed plates or other members, and to modifications of the fastening devices shown in my application Serial Number 571,412, filed January 5, 1945.

One object of the invention is to provide an improved device of this kind having means for adapting it for fastening sheets or plates of soft metal or other material without injury to the material.

Other objects of the invention are to provide an improved easily manufactured device of this kind, and to effect extreme simplicity and efficiency in such devices and to provide an extremely simple device of this kind which is convenient, durable, and reliable in use, economical to manufacture, and easy to apply.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

Briefly stated, inventive features for the accomplishment of these and other objects are shown herein in connection with an improved fastening device for securing together superposed outer and inner plate members having registering holes therein. The hole in the inner member is rectangular and elongated; and a sheet metal grommet disposed on the exposed face of the inner plate member comprises a marginal bead therearound and an intramarginal flat portion disposed against the inner plate member and cut to form an elongated opening registering with said rectangular hole and to provide at each end a tongue passed into said rectangular hole against the end walls thereof to position the grommet. A tubular shank disposed in said holes and opening has an outer head engageable with the outer plate member; and a wire locking member having an inturned yoke is secured to the free end of the tubular shank the member having arms disposable diagonally on opposite sides of the shank, the ends of which arms, on forward rotation of the shank, engaged against said intramarginal portion of the grommet to lock the plate members together, further rotation of the stud bringing the arm ends to the ends of the opening in the grommet, releasing the inner plate member from the outer member.

The diagonally disposed arms should not be rotated backwardly and a further object of the invention is to provide a turning means having a ratchet connection with the shank head to prevent the arms from being turned backwardly.

In the accompanying drawing showing, by way of example, one of many possible embodiments of the invention, Fig. 1 is a fragmental side elevation, partly in section, showing the fastener holding two plate members together;

Fig. 2 is an inner elevation or bottom plan of the fastener;

Fig. 3 is a plan of the shank head;

Fig. 4 is a plan or inner elevation of the grommet;

Figs. 5 and 6 show sections taken respectively on the lines 5—5 and 6—6 of Fig. 3; and Fig. 7 is a side elevation of the locking member before assembly.

My improved fastening device is shown in combination with a pair of superposed outer and inner plate members 10 and 11 respectively having superposed holes 12 and 13 therein, the hole 12 of the outer member being round and smaller than that of the hole 13 in the inner member and having opposite small marginal notches 14. The hole 13 in the inner member is rectangular and elongated and has its center registering with the center of the round hole 12.

A circular sheet metal locking grommet 16 disposed on said inner plate member 11 on the face away from the outer plate member 10 comprises an annular marginal bead 17 therearound pressed therein in a direction away from the plate members, and an intramarginal flat portion 18 engaged against the inner plate member 11 and cut to provide an elongated rectangular opening 19 (Fig. 4) registering with said rectangular hole 13 and to provide at each end a tongue 20 passed into said rectangular hole 13 of the inner plate member against the adjacent end faces 21 thereof and turned and clinched against the plate 11, which may, if desired be bent as by a hammer blow for that purpose. Said intramarginal flat portion 18 is provided at each side of the rectangular opening with an indentation 23 in its exposed face.

A stud 24 to hold said plate members together includes a tubular shank 25 disposed in said holes 12, 13 and opening 19, in which is received an inner stud 26 integral or one-piece with, or secured with a forced fit in, said shank 25 and terminating short of the inner end of the shank and having an outer flange head 27 (later to be described) engageable with the outer face of the outer plate member 10, thus providing a head for the shank. With the shank 25 and inner stud 26 integral with each other, the stud 24 consists merely of a tubular shank having a bore or hollow in its inner end.

Said shank 25 carries a locking member 30 of small spring wire having an inwardly turned U-shaped transverse yoke 31 received and clinched as at 32 in the free end of the hollow 33 of the tubular shank and having two arms 35 initially disposed straight longitudinally of opposite sides of the shank exteriorly of the shank and initially extending to near the flange 27.

When the stud and plate members are to be assembled, the plate members may be superposed and the shank 25 passed through the holes 12, 13, or the shank 25 may be first inserted in the outer plate 10, the arms 35 passing through the notches 14, after which the stud may be manually rotated forwardly, as hereinafter described, to cam the arms 35 against the outer plate and place the arms at a diagonal angle with the arm ends 36 against the inner face of the outer plate member between the notches thereof, to hold the stud in the outer plate member 10 in position to be later passed through the inner member 11.

Then the outer plate may be assembled on the inner plate, further rotation of the stud bringing the arm ends 36 to the ends of the rectangular opening in the grommet, camming the arms to said intramarginal flat portion 18 and into said indentations 23, to lock the plate members together. Further rotation of the stud may bring the arm ends again to the ends of the opening in the grommet, releasing the inner plate member from the outer member when desired.

As the arms 35 are rearwardly diagonally disposed when in engagement with the grommet, they should not be rotated backwardly, and ratchet means to effect forward rotation but preventing forcing rearward rotation will now be described.

Said head 27 (Fig. 3) is provided with opposite approximately quadrant shaped approximately flat-hollowed recesses 40 extending from the periphery to an axial bore 41 extending through the head to near the inner end of the inner stud. Each recess has an adjacent face of the recess forming an approximately radial rearwardly facing shoulder 42, the rear part of the recess being concaved and outwardly curved away from the bottom of the recess to form a cammed rear wall 43. A drive screw or pin 45 (Fig. 1) secured by a forced fit in said bore 41 forms a pivot pin having a head 46 spaced from the stud head 27, said pivot pin pivotally carrying a wing nut 47 having at the upper part of its center a hub 48 extending to near the lower edge of the wings 50 and having an unthreaded bore 51 received on said pin between the pin head 46 and stud head 27 and having a reduced diameter lower part 52 loosely rotatably received on the pin, the major part of the bore being of larger diameter and spaced from the pin to form a spring receiving chamber 51 receiving a helical spring 53 compressed between said heads, thereby yieldably holding the lower edge of said wings 50 held by the springs in said quadrant-shaped recesses. Said recesses 40 communicate with said bore 41 and said shoulders 42 being offset from each a distance about equal to the thickness of the wings, whereby the recesses are adapted to receive the wings with their diagonally opposite faces engaging said shoulders 42 whereby the stud and the stud member rigidly connected thereto may be turned forwardly only, said cammed faces camming the wings from the head when the wing nut is turned rearwardly, thereby preventing the forcing of the arms 35 backwardly.

The plate members 10, 11 may be of hard or soft metal, wood, fiber or other materials and the grommet may be of soft or hard metal and may serve as a protection for the member 11 against the action of the arm ends 36. The grommet may be omitted if the inner plate member 11 is hard enough.

It is not necessary that the notches 14 be located at the long axis of the opening 19 as shown or that they be provided at all if the material of the plate member 10 is soft enough or if the hole 12 is large enough to allow the arms 35 to pass when inserting the stud.

The invention claimed is:

1. In combination, superposed outer and inner plate members having registering holes therein; the hole in the inner member being rectangular and elongated; a sheet metal grommet disposed on the exposed face of said inner plate member and comprising a marginal bead therearound, and an intramarginal flat portion against the inner plate member and cut to form an elongated opening registering with said rectangular hole and to provide at each end a tongue passed into said rectangular hole against the end walls thereof to hold the grommet from turning around; a shank disposed in said holes and opening and having an outer head engageable with the outer plate member; and a locking member secured to the free end of the shank and having two arms secured to the shank at a part remote from the grommet disposed on opposite sides of the shank and pointed toward the grommet and engaging approximately perpendicularly with the arm ends against said flat portion, whereby the tongued grommet and said arms cooperate to hold the stud from turning.

2. A circular sheet metal locking grommet comprising an annular marginal bead therearound pressed therein, and an intramarginal flat portion cut to form a narrow elongated rectangular opening to provide at each end of the opening a tongue transverse to the plane of the grommet; said intramarginal flat portion being provided on each side of the rectangular opening with an indentation in its face.

3. A stud comprising a tubular shank having a head; and a locking member of small spring wire having an inwardly turned U-shaped transverse yoke including longitudinal arms received and clinched in the free end of the tube and having two arms initially disposed longitudinally of opposite sides of the shank and initially extending substantially to the flange, and adapted to be disposed at a diagonal angle to the shank.

4. A locking stud member comprising a shank having a head and arms at opposite sides of said shank; said head having opposite rearwardly facing shoulders; a wing nut pivotally and slidably mounted coaxially with the stud head engageable with said shoulders.

5. A locking stud member adapted to secure together superposed outer and inner members having registering holes therein, the hole in the inner member being elongated; said locking stud member comprising a head, and a shank disposed in said holes; a locking member secured to the shank and having diagonally rearwardly disposed arms engageable with the inner plate member on opposite sides of said elongated hole; said head having opposite rearwardly facing shoulders; a pivot mounted coaxially with the stud head; a wing nut having a central hub pivotally slidably received on the pivot and engageable with said shoulders.

6. A locking stud member comprising a tubular shank; an inner stud secured in said shank and having an outer head; arms secured on opposite sides of said shank; said head having opposite recesses, each having a rearwardly facing shoulder and an outwardly curved rear wall; a pivot pin secured in said inner stud having a head spaced from the stud head; a wing nut having a central hub received on said pin and having its wing disposable in said recesses.

7. A stud having a longitudinal bore in its inner end free of lateral openings; and a locking member having an inwardly turned yoke received and secured in the free end of said bore, and two arms extending from said free end and disposed on opposite sides of the stud and extended toward the other end of the stud.

8. In combination, a metal plate-like structure having a hole therethrough which is elongated and rectangular adjacent to the inner face of the structure; and a flat sheet metal grommet disposed flat on said face and comprising an intramarginal flat portion disposed flat against said face and cut to form an elongated opening registering with the rectangular part of said hole and provided at each end of the said rectangular part with a tongue passed into said rectangular part against the end walls thereof; said hole and opening being adapted to receive a stud having a head engageable with the plate member and arms having ends disposable and frictionally pressing against the flat portion to cause the flat portion to resist movement of the arm and rotation of the stud; the rectangular hole having the double function of receiving the stud and cooperating with the tongues to prevent the grommet from rotating or sliding on the metal plate structure thereby to resist rotation of the stud.

9. In combination, a rigid metal plate member having an elongated rectangular hole therein; and a flat sheet metal grommet disposed flat on a face of said plate member and comprising an intramarginal flat portion disposed flat against the plate member and cut to form a long narrow rectangular opening registering with said rectangular hole and providing at each end of the opening a tongue as wide as the opening passed into said rectangular hole against the end walls thereof and coacting with the end walls and adjacent parts of the side walls of the hole to prevent the grommet from sliding or turning on the member.

10. In combination, superposed outer and inner plate members having registering holes, the hole of the outer member being long, narrow and rectangular; a grommet disposable against the exposed face of the inner plate member having an intramarginal flat portion substantially entirely engaged against the inner plate member to be supported and backed by the inner member and cut to form an elongated rectangular opening registering with said rectangular hole and providing end tongues as wide as the opening engaging against the end walls of the rectangular hole to hold the grommet from sliding or turning around on the inner plate member; a stud passing through said openings and holes and having a head engaging the outer member and provided with stiff yieldable arms secured to the stud at the inner part thereof remote from the members and extended toward the members and having free ends firmly engaged with said intramarginal portion and pressing said portion against the backing of the inner member; said tongue and the backing by the inner member of said intramarginal portion by the inner member and the pressure of the free ends of the arms of the intramarginal portion providing a special definite coaction between the tongue, grommet, inner member and arm to resist rotation of the stud, the inner plate backing the intramarginal portion against the free ends of the arms.

11. A grommet disposable against a plate member having an elongated hole through which may be passed a stud having an outer end head and provided at the inner portion with arms extended toward the members and having free ends, said grommet comprising a plate having an intramarginal flat portion engageable against the plate member and provided with an elongated opening registerable with said elongated hole and provided at each end of the opening with a tongue adapted to be passed into said rectangular hole against the end walls thereof to hold the grommet from turning around or sliding on the plate member; said intramarginal flat portion being provided at sides of the rectangular opening with indentations in which said free ends may engage to yieldably hold the stud from turning relative to the grommet.

12. A locking stud member comprising a shank adapted to be rotated in forward direction on its axis and having a head, and arms at opposite sides of said shank; said head having rearwardly facing shoulders facing rearwardly relative to said direction; and a member mounted on said stud for oscillatory rotary movement on an axis substantially coaxial with the stud and carrying a part engageable with said shoulders.

13. A grommet disposable against a plate member having an elongated hole through which may be passed a stud having an outer end head engageable with the member and provided at the inner portion with arms extended toward the members and having free ends; said grommet comprising a plate having a wide intramarginal flat portion engageable flat against and adapted to be backed by the plate member provided with an elongated opening registerable with said elongating hole and provided at each end of the opening a tongue adapted to be passed into said rectangular hole against the end walls thereof to hold the grommet from turning around or sliding on the plate member; said intramarginal flat portion providing seats at the sides of the rectangular opening with which said free end may engage to yieldably hold the stud from turning relative to the grommet.

14. In combination, a stud having a longitudinal bore free of lateral openings and open at one end of the stud; and a wire locking member having a yoke secured in the open end of the bore, said member having two exterior arms joining the yoke and disposed on opposite sides of the stud and extended toward the other end of the stud.

15. A stud comprising a tubular shank having a free end and a head at the opposite end; and a wire locking member having inwardly turned inner arms inwardly turned toward the head and a yoke part all received and secured in the free end of the tube, said member comprising two exterior arms joining the inner arms and disposed on opposite sides of the shank exteriorly of the shank and extended toward the head.

16. In combination, a stud having a longitudinal bore at the inner end, and a head on the outer end of the shank; and a locking member of spring wire having an inwardly turned U-shaped part comprising a transverse yoke and two inner arms received and clinched in the free end of the bore, said member having two exterior arms joining the inner arms and disposed exteriorly of the stud on opposite sides of the stud and extending toward the head.

ERNEST SCHLUETER.

REFERENCES CITED

The following references are of record in the file of this patent:

UNITED STATES PATENTS

| Number | Name | Date |
|---|---|---|
| 395,473 | Bartley | Jan. 1, 1889 |
| 581,901 | Cole | May 4, 1897 |
| 674,841 | Horsley | May 21, 1901 |
| 900,318 | Smith | Oct. 6, 1908 |
| 1,798,526 | Fitzgerald | Mar. 31, 1931 |
| 1,842,471 | Bengtsson | Jan. 26, 1932 |
| 1,895,672 | Loughman | Jan. 31, 1933 |
| 2,054,519 | Dzus | Sept. 15, 1936 |
| 2,123,063 | Summers | July 5, 1938 |
| 2,350,498 | Dick | June 6, 1944 |
| 2,373,722 | Von Opel | Apr. 17, 1945 |

FOREIGN PATENTS

| Number | Country | Date |
|---|---|---|
| 205,785 | Great Britain | 1924 |